US009015382B2

(12) United States Patent
Guzman

(10) Patent No.: US 9,015,382 B2
(45) Date of Patent: Apr. 21, 2015

(54) CUSTOMIZABLE USER INTERFACE FOR EXTERNAL DEVICES

(75) Inventor: Jorge H. Guzman, Gaithersberg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 692 days.

(21) Appl. No.: 11/475,743

(22) Filed: Jun. 27, 2006

(65) Prior Publication Data

US 2007/0162664 A1      Jul. 12, 2007

Related U.S. Application Data

(60) Provisional application No. 60/754,491, filed on Dec. 28, 2005.

(51) Int. Cl.
| | |
|---|---|
| *G06F 13/12* | (2006.01) |
| *H04N 7/16* | (2011.01) |
| *H04N 7/20* | (2006.01) |
| *H04N 21/414* | (2011.01) |
| *H04N 21/442* | (2011.01) |
| *H04N 21/485* | (2011.01) |
| *H04N 21/61* | (2011.01) |

(52) U.S. Cl.
CPC ............. *H04N 7/163* (2013.01); *H04N 7/20* (2013.01); *H04N 21/41422* (2013.01); *H04N 21/4424* (2013.01); *H04N 21/485* (2013.01); *H04N 21/6143* (2013.01)

(58) Field of Classification Search
USPC .......................................................... 710/62
See application file for complete search history.

(56) References Cited

U.S. PATENT DOCUMENTS

| | | | | |
|---|---|---|---|---|
| 5,446,488 | A * | 8/1995 | Vogel ............................. 725/151 |
| 6,101,368 | A * | 8/2000 | Farnsworth et al. ........... 725/135 |
| 2003/0145321 | A1* | 7/2003 | Bates et al. ..................... 725/25 |
| 2004/0078807 | A1* | 4/2004 | Fries et al. ...................... 725/14 |
| 2004/0263658 | A1* | 12/2004 | Cozier et al. ............. 348/333.01 |

* cited by examiner

*Primary Examiner* — Henry Tsai
*Assistant Examiner* — Juanito Borromeo

(57) ABSTRACT

A system and method for controlling an external device from a first device include a display and a user interface associated with the first device. The first device has a first controller and a first data port. An external device has an external controller and a second data port coupled to the first data port. The external device communicates a command and a command identifier to the first controller. The first controller causes the display to display the command. When the command is selected by the user interface, the first controller transmits the command identifier to the external controller through the first and second data port.

28 Claims, 6 Drawing Sheets

Customizable OI

| Command | Command ID | Data |
|---|---|---|
| Dew Mitigation | 1 | |
| Go to Satellite 101 | 2 | |
| Go to Satellite 119 | 3 | |
| Go to Satellite 110 | 4 | |
| Run Diagnostic | 5 | A B C D |

CUSTOMIZABLE USER INTERFACE FOR EXTERNAL DEVICES

TECHNICAL FIELD

The present invention relates generally to a mobile receiving device, and more specifically, to a method for providing an interface that is customizable by controlling the displayed information through the receiving device according to an external device.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Both personal and residential units may be coupled to a variety of external devices. Typically, control of each device is separate in terms of controlling operating parameters of each device. A control or interface such as a remote control, keypad or buttons must be provided for each device. Providing separate interfaces increases the cost of the system.

It would therefore be desirable to provide a system that allows a receiving device to control other external devices generically without having to specifically configure for that device.

SUMMARY OF THE INVENTION

The present invention provides a method of operating a receiving device such as but not limited to a set top box that allows an external device such as an antenna to exchange information with the receiving device such as an antenna to allow control of the external device from the receiving device and its associated user interface.

One feature of the invention is a system that includes a display, a user interface and a first device. The first device has a first controller and a first data port. An external device has an external controller and a second data port coupled to the first data port. The external device communicates a command and a command identifier to the first controller. The first controller causes the display to display the command. When the command is selected by the user interface, the first controller transmits the command identifier to the external controller through the first and second data port.

Another feature of the invention, is a method that includes communicating a command and a command identifier from an external controller to a first controller, displaying the command on a display, selecting the command, transmitting the command identifier from the first controller to the external controller in response to selecting, receiving the command identifier at the external device, and performing an action at the external device in response to the command identifier.

One advantage of this configuration is that the cost may be reduced for the overall system by reducing the number of required user interfaces. Even if the external device includes a user interface, the convenience of adjusting the external device through the receiving device provides increase convenience.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 3 is a table of command IDs and commands along with an optional data column that may be provided to a controller from an external controller.

DETAILED DESCRIPTION

Figure 1:
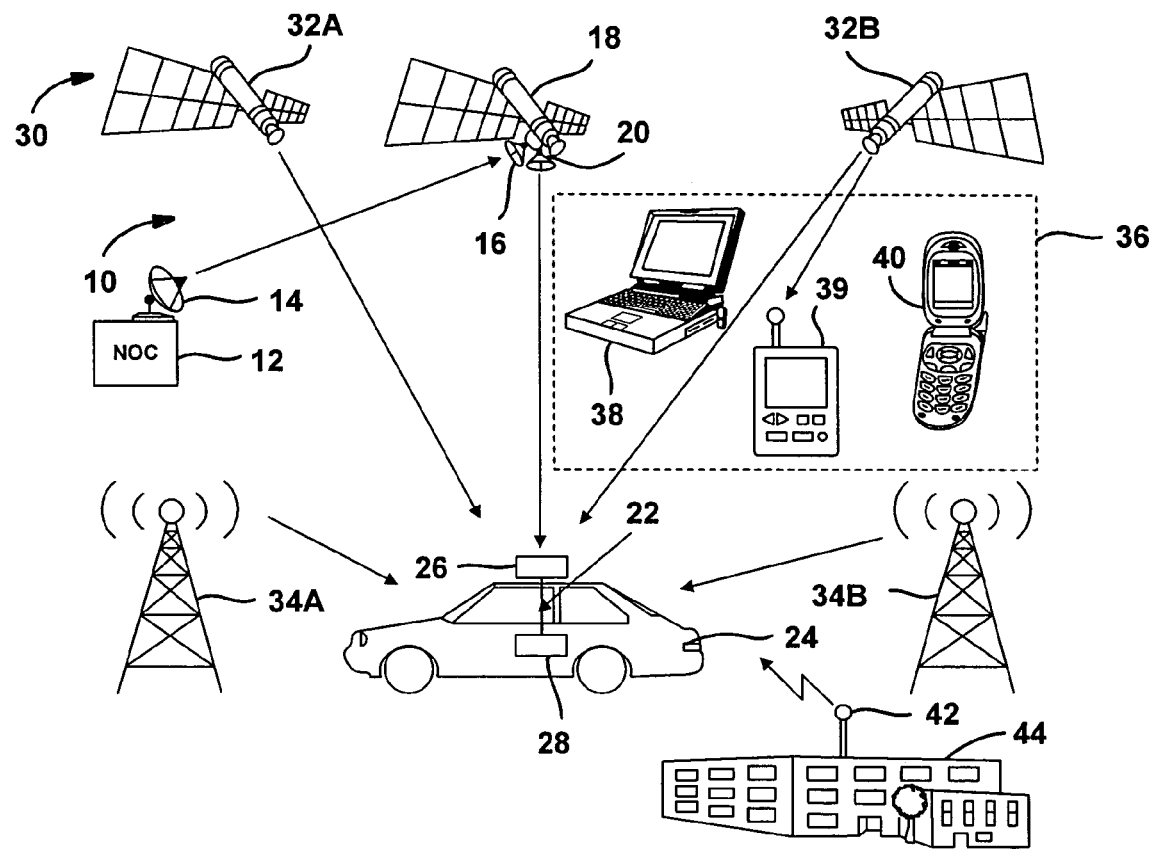
FIG. 1 is a system level view of a satellite broadcasting system according to the present invention.

In the following figures the same reference numerals will be used for the same views. The following figures are described with respect to a mobile satellite television system. However, those skilled in the art will recognize the teachings of the present invention may be applied to various types of mobile reception including land-based type systems. The present invention may also be implemented in various types of electronic devices so that device can present information through another device. Thus, the present invention not only relates to mobile satellite television receiving devices, but to non-mobile applications and other electronic devices Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a satellite 18. The wireless signals, for example, may be digital. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. A receiving antenna 26 receives the wireless signals from the satellite 18 and processes the signals in a mobile receiving unit 28. The mobile receiving unit 28 may be similar a set top box or an integrated receiver decoder and will be further described below.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. Cellular phones typically include a GPS locating system. As the vehicle 24 moves about, the exact coordinates in latitude and longitude may be used to determine the proper designated marketing area for local television and broadcasting.

The present invention may also be used for displaying various wireless information on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be broadcast from various other types of broadcasting areas such as an antenna 42 on a building 44. The building 44 may be various types of buildings such as a store and the wireless information transmitted from the antenna 42 may be advertising information. All of the wireless signals preferably include location information transmitted therewith. As will be described below, the information may be coded digitally into the signals. Thus, by reviewing the location information, signals appropriate for the location of the mobile devices may be displayed on the various devices.

Figure 2:
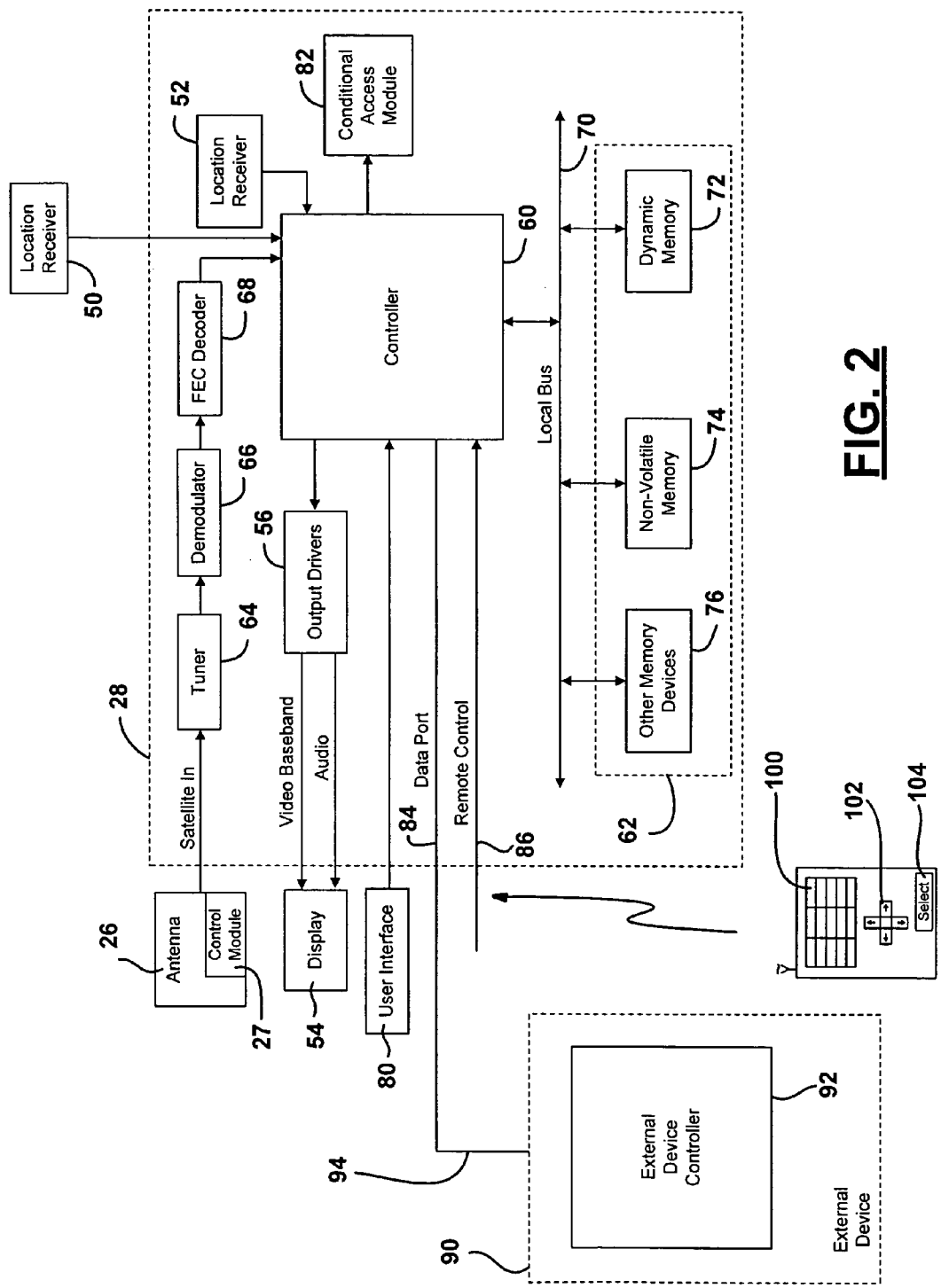
FIG. 2 is a block diagrammatic view of a vehicle having a receiving system according to the present invention.

Referring now to FIG. 2, a receiving unit 22 is illustrated in further detail. Although the receiving unit 22 is illustrated, or is merely representative of various electronic devices with internal controllers. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 50 such as GPS receiver. The antenna 26 may also be an electronic antenna. The antenna 26 may include an internal controller 27 that controls the operation of the antenna 26.

The mobile receiver unit 28 is coupled to antenna 26 with a two-way communication channel such as a wire or a wireless system. The mobile receiving unit 28 may also include a location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to location receiver 52 and/or location receiver 50. The mobile receiving unit 28 includes a display 54. The display 54 may be incorporated into the device 36 or within the vehicle 24. The display 54 may include output drivers 56 used for generating the desired audio and video outputs suitable for the particular display 54.

A controller 60 may be a general processor such as a microprocessor. The controller 60 may be used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DirecTV set top boxes which employ a chip-based multifunctional controller.

The controller 60 may include or be coupled to a local bus 70. The local bus 70 may be used to couple a dynamic memory 72 such as RAM which changes often and whose contents may be lost upon the interruption of power or boot up. The bus 70 may also be coupled to a non-volatile memory 74. The non-volatile memory may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 76 may also be coupled to local bus 70. The other memory devices may include other types of dynamic memory, non-volatile memory, or may include such devices such as a digital video recorder. The display 54 may be changed under the control of controller 60 in response to the data in the dynamic memory 72 or non-volatile memory 74.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 64 is illustrated as part of the mobile receiving unit. However, should the unit be incorporated into a vehicle, the user interface 80 may be located external to the mobile receiving unit such as dial buttons, voice activated system, or the like incorporated into the vehicle and interface with the mobile receiving unit.

A conditional access module card 82 (CAM) may also be incorporated into the mobile receiving unit. Access cards such as a conditional access module (CAM) cards are typically found in DirecTV units. The access card 82 may provide conditional access to various channels and wireless signals generated by the system. Not having an access card or not having an up-to-date access card 66 may prevent the user from receiving or displaying various wireless content from the system.

FIG. 2 also shows an external device 90 that has an external device controller 92 with a data port 94. The external device 90 may include various types of devices such as an antenna, a TV tuner, a DVD player, a DVR player, or any other type of external device that may include an external controller 92. Under certain conditions, it may be desirable to allow the receiving device 28 to provide a customizable user interface to the external device 90. That is, the controller 60 may generate various screens whose information is provided by the external device controller 92. The screens are filled in or display information received from the external device controller 92. Upon selection of information on the screen, the external device controller 92 is notified so that certain actions may be performed at the external device 90. The data port 94 of the external device controller 92 is coupled to the data port 84 or a dedicated port of the controller 60. The screen functions will be further described below.

One user interface is a remote control device 98 having a key pad 100, an arrow key pad 102, and a select button 104 may also be provided. Inputs to the receiver 28 may be provided by the remote control device 28 or through another type of user interface 80.

Referring now also to FIG. 3, as mentioned above, a customizable user interface may be provided. The external controller device 92 may send a table 110 such as that shown in FIG. 3 having various commands and command identification numbers and potentially data to be stored in memory 62. The memory 62 may include dynamic memory 72, non-volatile memory 74 or other memory device 76. The nature of the information may be temporary and thus dynamic memory is suitable for this application. Such information may also be stored in non-volatile memory 74 or other memory devices 76.

The table has three columns: a command column, a command identification column (ID) and an optional data column. The table 110 may be updated periodically even during operation of either the receiving device 28 or the external device 90. As illustrated in FIG. 3, each command has a command ID. Thus, the command wording is provided to the user on the display 54 and when the wording is selected by the user operating the remote control or the user interface, the command ID such as "1" for dew mitigation of an antenna is sent back to the external device controller 92 so that the antenna may turn on a heater to remove the dew from the antenna. The receiving device 28 does not interpret the commands, it merely provides the command ID associated with the particular command.

As shown in FIG. 3, an optional data column may be provided. The data may also be provided to the receiving device 28 to be displayed upon the screen. For example, during a run diagnostic command, various data may be returned from the external device controller 92 to be provided to the controller 60, which in turn may be provided to the display. These may correspond to codes required for certain maintenance procedures, fault detection or the like.

Figure 4:
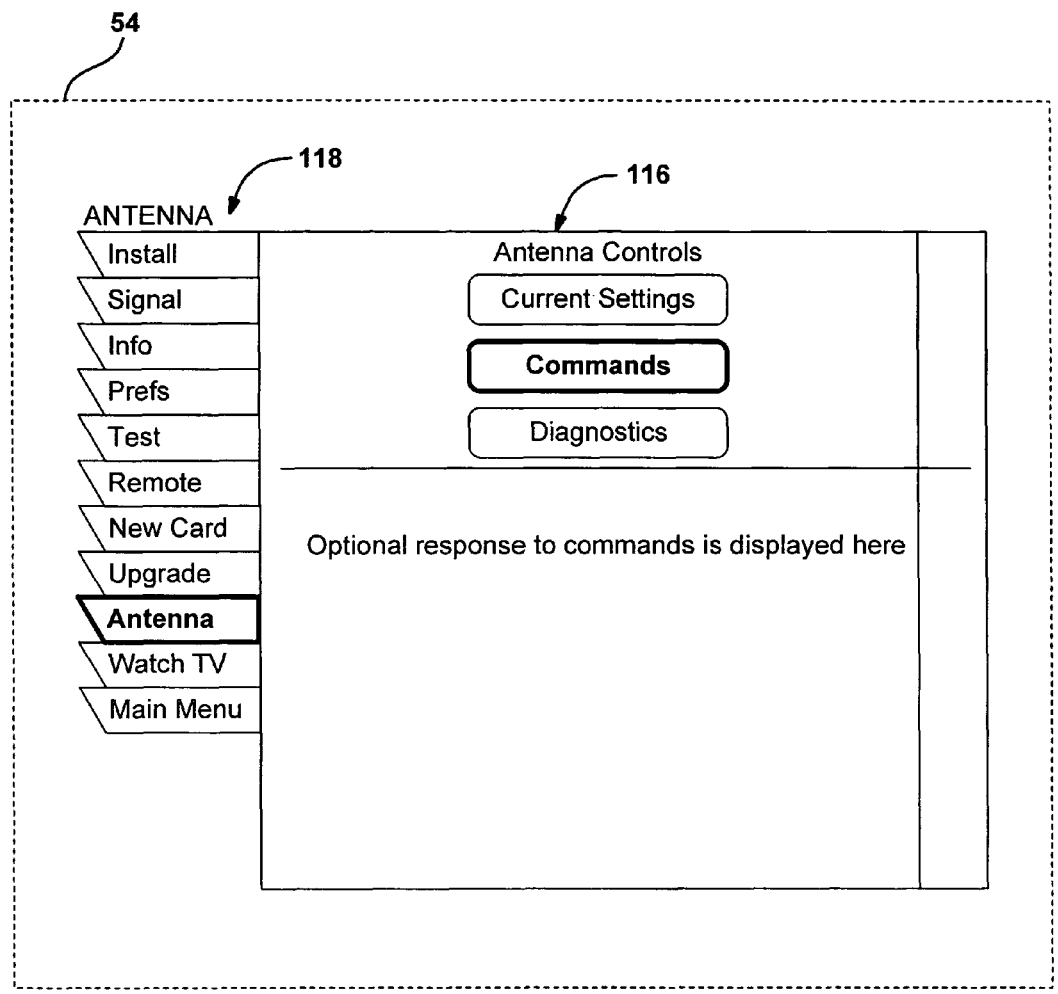
FIG. 4 is menu display according to the present invention.
Figure 5:
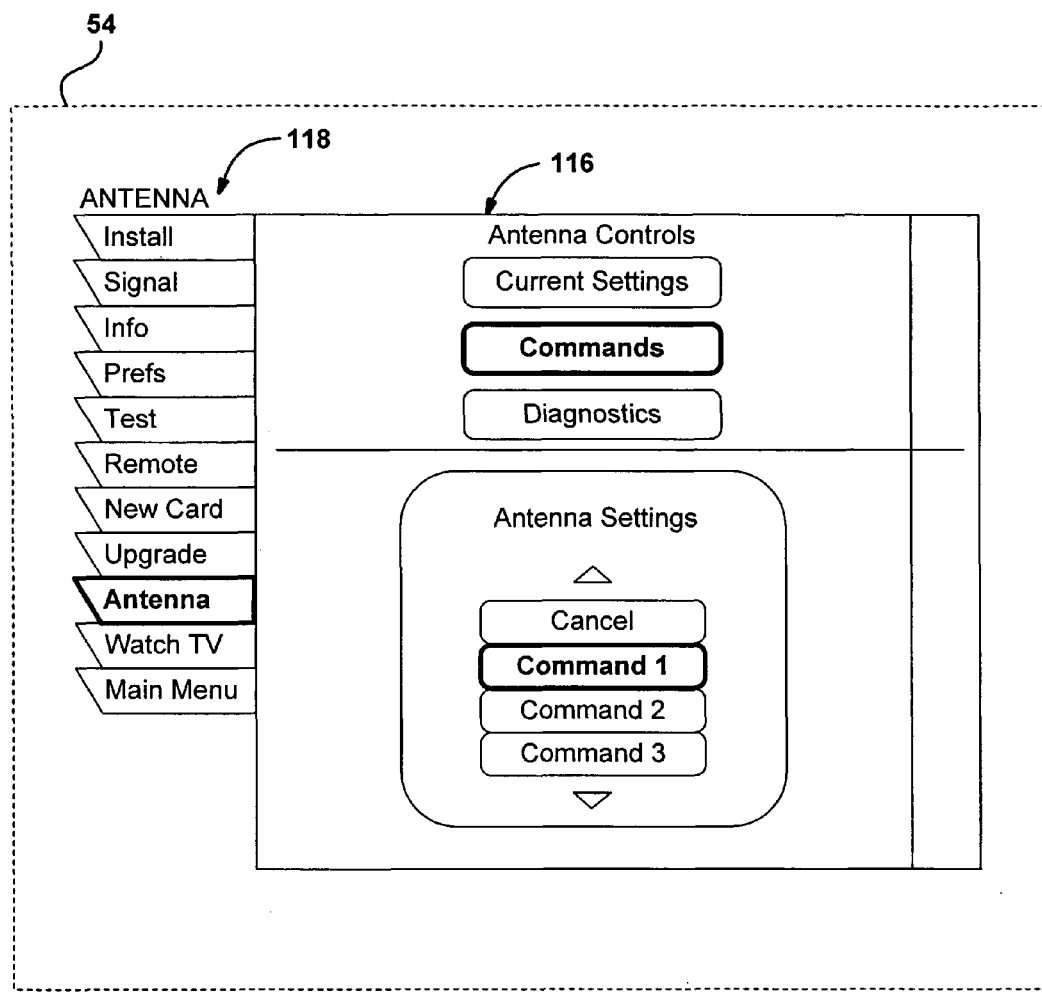
FIG. 5 is a command menu display according to the present invention.

Referring now to FIG. 4, display 54 having screen indicia 116 corresponding to the command is illustrated. Some screen indicia include menu selections 118 on the left side of the display. The up and down arrows or the numeric buttons on the remote or the user interface may be used to select one of the antenna selections. Selections may be displayed in reverse type, colored boxes, arrows, colored wording, underlines or various other ways to set apart the selected item. The system may also be a menu type system. In this case the antenna menu selection is selected. In response three boxes for selection are generated. If the command box is selected, FIG. 5 is displayed. FIG. 5 provides a customizable user interface for the device.

Referring now to FIG. 5, a screen layout of a display 54 is illustrated. The screen display has various commands set forth as command 1, command 2, and command 3. If one of the menu commands is selected by the select button 104 or other selection type device such as user interface 80, the command ID is returned to the external device controller. Thus, the external device controller 92 may perform the action corresponding to the command ID.

Figure 6:
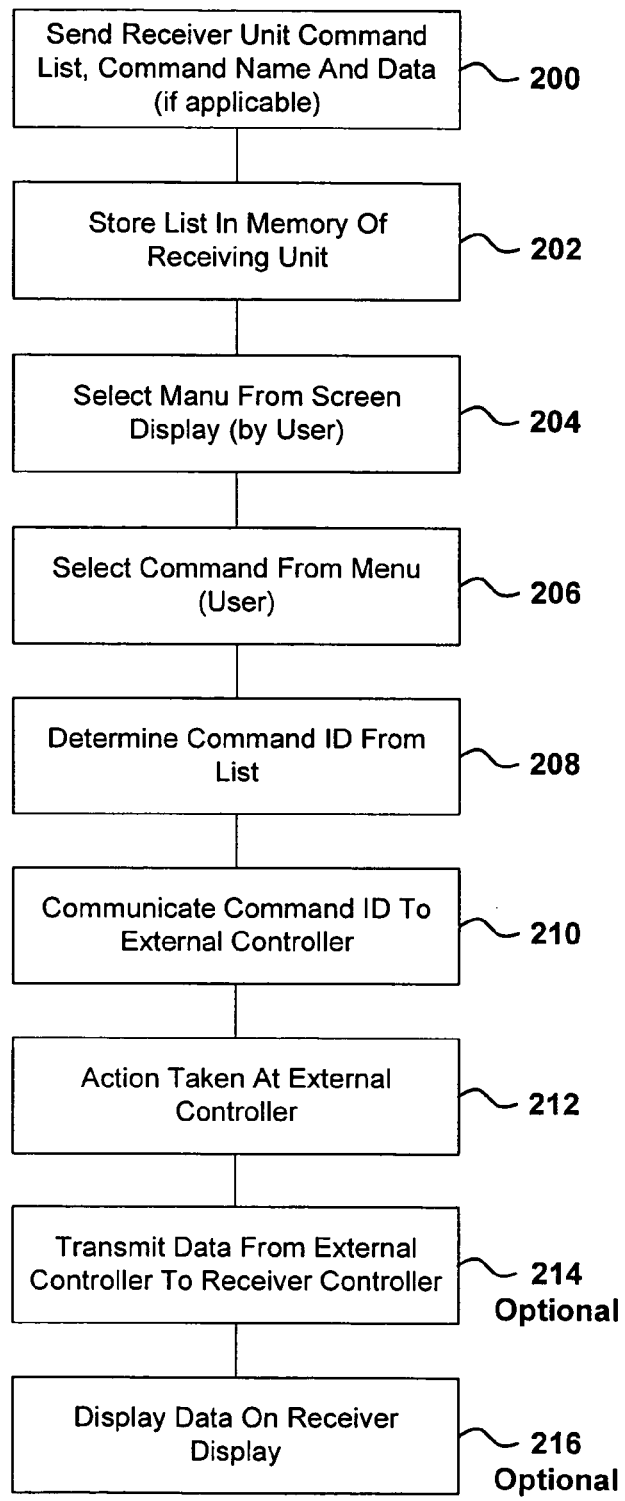
FIG. 6 is a flow chart illustrating one method for operating the present invention.

Referring now to FIG. 6, a method for operating a customizable user interface is illustrated. In step 200 the receiving unit or other device is sent a command list, command name, and possibly data if applicable. As mentioned above, the data may be provided in response to a command from the receiving unit. In step 202, the list is stored in the receiving unit such as in the dynamic memory or non-volatile memory. In step 204, the user activates a menu from the screen display. The menu may be selected in various manners including the user interface 80 or the remote control device 98. In step 206, a command may be selected from the menu in a similar manner. In step 208, a command ID is selected from the list corresponding to the selected command in the receiving device. In step 210, the command ID is communicated to the external controller. In step 212, the external controller received the command ID and performs an operation in response to the command ID. Optional step 214 may be performed after step 212. In step 214, external data may be transmitted from the external controller to the receiver controller. This data may be displayed on the display in optional step 216 in various formats according to the particular needs of the device.

While particular embodiments of the invention have been shown and described, numerous variations and alternate embodiments will occur to those skilled in the art. Accordingly, it is intended that the invention be limited only in terms of the appended claims.

What is claimed is:

1. A system comprising:
    a display;
    a user interface;
    a first device coupled to the display and the user interface, said first device having a first controller and a first data port; and
    an external device having an external controller and a second data port coupled to the first data port, said external device communicating a plurality of command wordings and a plurality of command identifiers corresponding to the command wordings to the first controller;
    said first controller causing the display to display the plurality of command wordings and when a first command wording of the plurality of command wordings is selected by the user interface, said first controller determining a first command identifier from the plurality of command identifiers corresponding to the first command wording and transmitting the first command identifier and not the command wording to the external controller through the first and second data port;
    said external controller controlling an operation of the external device in response to the first command identifier.

2. A system as recited in claim 1 wherein the first device comprises a satellite television receiving unit.

3. A system as recited in claim 1 wherein the first device comprises a television.

4. A system as recited in claim 1 wherein the first device comprises a receiving unit.

5. A system as recited in claim 1 wherein the first device comprises a satellite receiving unit.

6. A system as recited in claim 1 wherein the external device comprises an antenna.

7. A system as recited in claim 1 wherein the external device comprises a recorder.

8. A system as recited in claim 1 wherein the external device comprises a digital video recorder.

9. A system as recited in claim 1 wherein the first or second data ports comprise an RF input.

10. A system as recited in claim 1 wherein the first or second data ports comprise an RF wireless input.

11. A system as recited in claim 1 wherein the first or second data ports comprise a wired input.

12. A system as recited in claim 1 wherein the first or second data ports comprise an infrared input.

13. A system as recited in claim 1 wherein the user interface comprises a button.

14. A system as recited in claim 1 wherein the user interface comprises a keypad.

15. A system as recited in claim 1 wherein the user interface comprises a selector input.

16. A system as recited in claim 1 wherein the user interface comprises a remote control device.

17. A system as recited in claim 1 further comprising a memory coupled to the first controller, said memory storing the command and the command identifier in a table.

18. A mobile satellite television system for a vehicle comprising:
    a display disposed within the vehicle;
    a user interface;
    a satellite television receiving device disposed within the vehicle coupled to the display and the user interface, said satellite television receiving device having a first controller and a first data port, said satellite television receiving device comprising a memory; and
    an antenna having an external controller and a second data port coupled to the first data port, said antenna communicating a plurality of command wordings and a plurality of command identifiers corresponding to the command wordings to the first controller;
    said first controller storing the plurality of command identifiers and the plurality of command wordings in a table in the memory of the satellite television receiving device, said first controller causing the display to display the plurality of command wordings and when a first command wording of the plurality of command wordings is selected by the user interface, said first controller determining a first command identifier from the plurality of command identifiers corresponding to the first command wording and transmitting the first command identifier and not the command wording to the external controller through the first and second data port;

said external controller controlling an operation of the antenna in response to the first command identifier.

19. A system as recited in claim 18 wherein the first or second data ports comprise an RF wireless input.

20. A system as recited in claim 18 wherein the first or second data ports comprise a wired input.

21. A system as recited in claim 18 wherein the user interface comprises a button or keypad.

22. A system as recited in claim 18 wherein the user interface comprises a selector input.

23. A system as recited in claim 18 wherein the user interface comprises a remote control device.

24. A method comprising:

communicating a plurality of command wordings and a plurality of command identifiers corresponding to the plurality of command wordings from an external controller to a first controller;

displaying the plurality of command wordings on a display;

selecting a first command wording from the plurality of command names;

determining a first command identifier from the plurality of command identifiers corresponding to the first command wording;

transmitting the first command identifier and not the first command wording from the first controller to the external controller in response to selecting;

receiving the command identifier at the external device; and performing an action at the external device in response to the first command identifier.

25. A method as recited in claim 24 wherein displaying the plurality of command wordings comprises displaying screen indicia corresponding to the plurality of commands.

26. A method as recited in claim 24 wherein selecting the first command wording comprises selecting the first command wording from a menu.

27. A method as recited in claim 24 wherein performing an action comprises transmitting data to the external controller.

28. A method as recited in claim 24 wherein displaying the plurality of command wordings comprises displaying the first command wording on the display associated with a satellite television set top box.

* * * * *